US008588838B2

(12) United States Patent  
Kim et al.

(10) Patent No.: US 8,588,838 B2  
(45) Date of Patent: Nov. 19, 2013

(54) APPARATUS AND METHOD FOR CONTROLLING POWER IN MOBILE COMMUNICATION SYSTEM

(75) Inventors: Seong-Min Kim, Daejon (KR); Heon-Kook Kwon, Daejon (KR); Joon-Hyung Kim, Daejon (KR); Kwang-Chun Lee, Daejon (KR)

(73) Assignees: Electronics and Telecommunications Research Institute, Daejeon (KR); Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1483 days.

(21) Appl. No.: 12/178,323

(22) Filed: Jul. 23, 2008

(65) Prior Publication Data  
US 2009/0143091 A1 Jun. 4, 2009

(30) Foreign Application Priority Data  
Dec. 4, 2007 (KR) .................... 10-2007-0124969

(51) Int. Cl.  
*H04B 7/00* (2006.01)

(52) U.S. Cl.  
USPC .............. 455/522; 455/127.1; 455/67.11; 370/252; 370/318

(58) Field of Classification Search  
USPC ........ 455/424, 425, 456.2, 277.2, 504, 115.3, 455/115.4, 68, 226.3, 229, 230, 452.2, 450, 455/67.16, 67.11, 127.1, 522; 370/252, 370/329, 318, 310.2, 328, 332, 206; 375/260, 261, 298, 326, 339  
See application file for complete search history.

(56) References Cited

U.S. PATENT DOCUMENTS

| 7,330,700 B2 * | 2/2008 | Aizawa ................... 455/67.13 |
| 7,986,612 B2 * | 7/2011 | Duan et al. ................. 370/206 |
| 8,195,099 B2 * | 6/2012 | Bhattad et al. ............... 455/69 |
| 2005/0191965 A1 * | 9/2005 | Yu et al. ................... 455/67.16 |
| 2005/0277422 A1 * | 12/2005 | Baker et al. ................. 455/450 |
| 2006/0203727 A1 * | 9/2006 | Aizawa et al. ............... 370/235 |
| 2007/0115796 A1 | 5/2007 | Jeong et al. |
| 2008/0080469 A1 * | 4/2008 | Kolding et al. .............. 370/342 |
| 2009/0131066 A1 * | 5/2009 | Barve et al. ............... 455/452.2 |
| 2010/0014473 A1 * | 1/2010 | Ofuji et al. ................. 370/329 |
| 2010/0061258 A1 * | 3/2010 | Seo et al. ................... 370/252 |

FOREIGN PATENT DOCUMENTS

| JP | 2007-110529 A | 4/2007 |
| KR | 10-2003-0080165 | 10/2003 |
| KR | 10-2006-0050934 | 5/2006 |
| KR | 10-2007-0027844 A | 3/2007 |
| KR | 1020070076678 A | 7/2007 |
| KR | 10-2008-0040575 A | 5/2008 |
| WO | 2008/054143 A1 | 5/2008 |

* cited by examiner

*Primary Examiner* — Sujatha Sharma  
(74) *Attorney, Agent, or Firm* — Kile Park Reed & Houtteman PLLC

(57) ABSTRACT

Provided is an apparatus and method for controlling power in a mobile communication system. The apparatus includes a moving speed measuring unit for measuring a moving speed of the terminal, a Channel Quality Indicator (CQI) processing unit for requesting a base station to adjust a CQI report frequency when the moving speed measured by the moving speed measuring unit exceeds a threshold value, and determining a CQI report frequency based on information on the CQI report frequency received from the base station to report CQI, and a power controller for performing a power control in response to a power control signal created by the CQI reported from the base station.

12 Claims, 4 Drawing Sheets

APPARATUS AND METHOD FOR CONTROLLING POWER IN MOBILE COMMUNICATION SYSTEM

CROSS-REFERENCE TO RELATED APPLICATIONS

The present invention claims priority of Korean Patent Application No. 10-2007-0124969, filed on Dec. 4, 2007, which is incorporated herein by reference.

BACKGROUND OF THE INVENTION

1. Field of the Invention

The present invention relates to an apparatus and method for controlling power in a mobile communication system; and, more particularly, to a power control apparatus and method for a mobile communication system, which can efficiently perform a power control even when there is an abrupt change in a wireless channel environment that occurs while a mobile communication terminal moves at high speed, by allowing a terminal to request a base station to adjust Channel Quality Indicator (CQI) report frequency based on its own moving speed, and allowing, in response to such request for CQI report frequency adjustment from the terminal, the bases station to determine an optimal CQI report frequency using a downlink data transmission rate and an uplink data transmission rate of the terminal.

This work was supported by the IT R&D program of MIC/IITA [2005-S-404-13, "Research & Development of Radio Transmission Technology for 3G evolution"].

2. Description of Related Art

In conventional mobile communication systems, a power control method is generally carried out as follows.

First, when a terminal measures CQI every a k-number of subframes and then reports it to a base station, the base station extracts a Signal to Interference Ratio (SIR) from the CQI reported from the terminal.

Next, the base station calculates a downlink output power based on the extracted SIR and then adds a certain margin set in consideration of errors in measurement and calculation to the calculated output power to finally calculate a downlink output power.

Thereafter, for stability of output power, the base station obtains an average value of CQIs for an M-number of subframes which is larger than or equal to a k-number of subframes corresponding to a CQI report frequency to determine a stable downlink output power.

Hereinafter, an example frame structure of an uplink High Speed-Dedicated Physical Control Channel (HS-DPCCH) will be described with reference to FIG. 1.

As shown in FIG. 1, the uplink HS-DPCCH transmits an uplink feedback signaling associated with downlink High Speed-Downlink Shared Channel (HS-DSCH) data transmission. The feedback signaling consists of Acknowledgement (ACK)/Negative ACK (NACK) information for composite Automatic Repeat Request (ARQ) and CQI.

An HS-DPCCH frame is divided into 5 subframes with length of 2 ms, each of which is composed of 3 slots. The ACK/NACK information for composite ARQ is sent into a first slot of each subframe and CQI is sent into second and third slots of each subframe. HS-DPCCH is always sent along with an uplink DPCCH.

CQI permits a mobile station to transfer status information of downward wireless channel obtained from measurement of downlink Common Pilot Channel (CPICH) or Transport Format and Resource Indicator (TFRI) value calculated from the status information to a bases station. And, ACK/NACK serves to inform ACK or NACK information on transmission of user data packet to downlink HS-DSCH by a hybrid ARQ mechanism.

In the above-discussed conventional method, however, when a terminal reporting CQI every a k-number of predetermined subframes moves at high speed, there may be a large channel change that occurs between reports of CQI. Because of this, a transmission power determined by CQIs previously reported is not suitable for a next output signal, which results in a loss of packets.

SUMMARY OF THE INVENTION

It is, therefore, an object of the present invention to provide a power control apparatus and method for a mobile communication system, which can efficiently perform a power control even when there is an abrupt change in a wireless channel environment that occurs while a mobile communication terminal moves at high speed, by allowing a terminal to request a base station to adjust a CQI report frequency based on its own moving speed, and, in response to such request for CQI report frequency adjustment from the terminal, the bases station to determine an optimal CQI report frequency using a downlink data transmission rate and an uplink data transmission rate of the terminal.

In accordance with an aspect of the present invention, there is provided an apparatus for controlling power in a terminal, including: a moving speed measuring unit for measuring a moving speed of the terminal; a Channel Quality Indicator (CQI) processing unit for requesting a base station to adjust a CQI report frequency when the moving speed measured by the moving speed measuring unit exceeds a threshold value, and determining a CQI report frequency based on information on the CQI report frequency received from the base station to report CQI; and a power controller for performing a power control in response to a power control signal created by the CQI reported from the base station.

In accordance with another aspect of the present invention, there is provided a method for controlling power in a terminal, including: determining to make a request for Channel Quality Indicator (CQI) report frequency adjustment to a base station when a moving speed of the terminal exceeds a threshold value; transmitting a request message for CQI report frequency adjustment to the base station based on the determination; determining a CQI measurement and report frequency depending on information on CQI report frequency from the base station and reporting CQI to report CQI; and performing a power control in response to a power control signal created by the CQI reported from the base station.

In accordance with another aspect of the present invention, there is provided an apparatus for controlling power in a base station, including: a storing unit for storing information on Channel Quality Indicator (CQI) report frequency corresponding to an uplink data transmission rate; a CQI report frequency processing unit for comparing a downlink data transmission rate of a terminal with an average downlink data transmission rate of all terminals in response to a request message for CQI report frequency adjustment to determine a CQI report frequency corresponding to the uplink data transmission rate of the terminal; and a power controller for performing a power control of all terminals based on the CQI reported from the terminal.

In accordance with another aspect of the present invention, there is provided a method for controlling power in a base station, including: receiving a request message for Channel Quality Indicator (CQI) report frequency adjustment from a terminal; checking an uplink data transmission rate of the terminal when a downlink data transmission rate of the terminal exceeds an average downlink data transmission rate of all terminals; searching for a CQI report frequency corresponding to the checked uplink data transmission rate from a CQI report frequency database; transmitting a message containing information on the searched CQI report frequency to all terminals; and performing a power control of all terminal based on CQI reported from the terminal.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter, and thus, the present invention will easily be practiced by those skilled in the art to which the present invention pertains. Further, in the following description, well-known arts will not be described in detail if they could obscure the invention in unnecessary detail. Hereinafter, preferred embodiments of the present invention will be described in detail with reference to the accompanying drawings.

Figure 1:
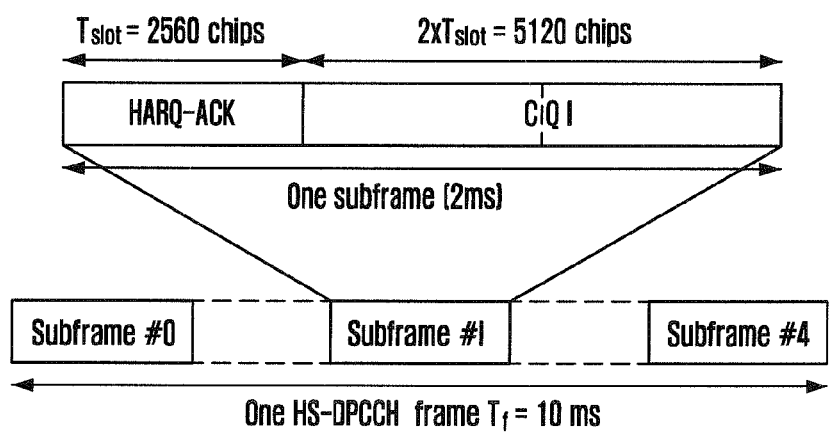
FIG. 1 shows an example of a frame structure of a conventional uplink HS-DPCCH.
Figure 2:
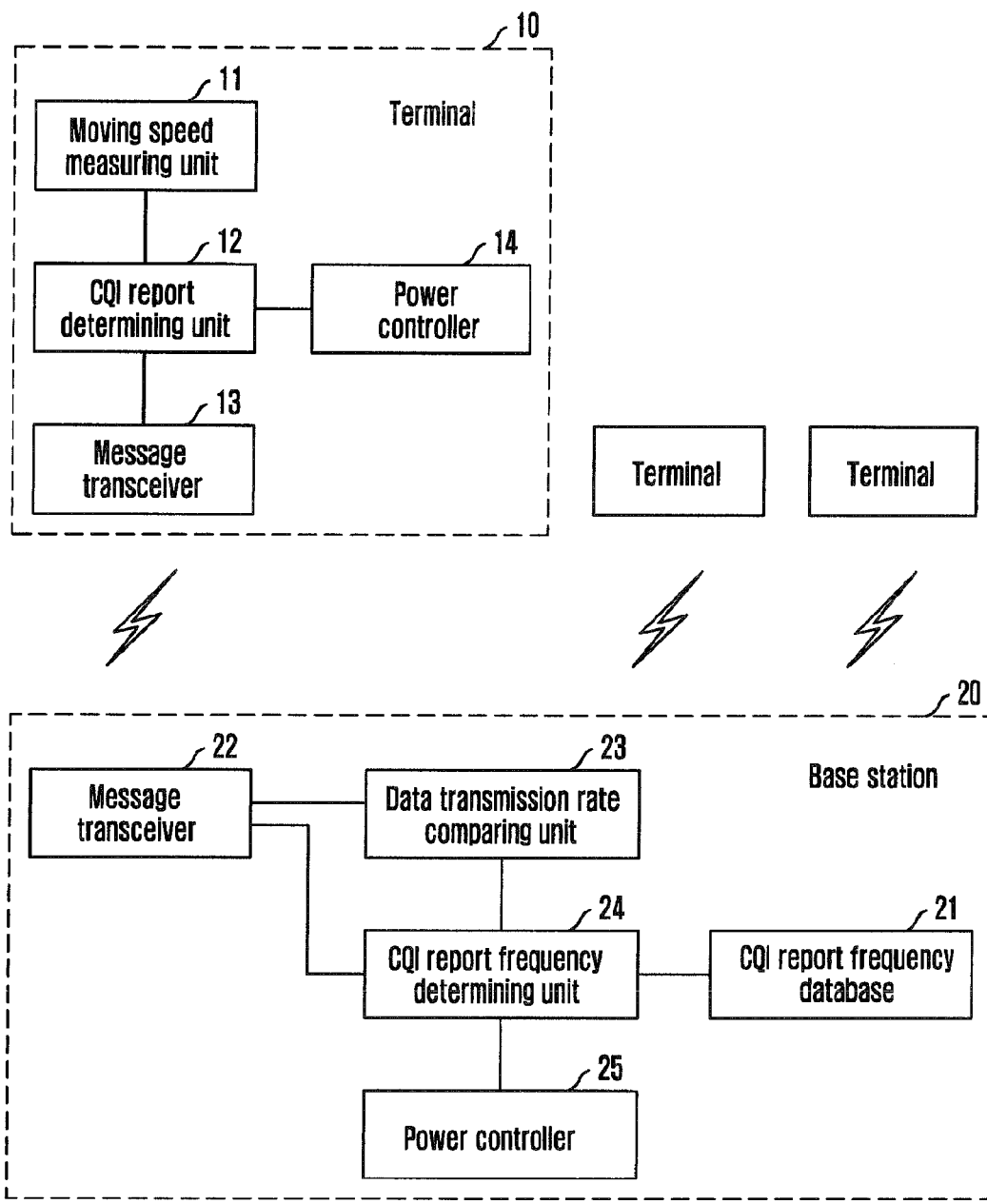
FIG. 2 illustrates a block diagram of an apparatus for controlling power in a mobile communication system in accordance with one embodiment of the present invention.

FIG. 2 illustrates a block diagram of an apparatus for controlling power in a mobile communication system in accordance with one embodiment of the present invention, particularly each of an apparatus for controlling power in a terminal 10 and an apparatus for controlling power in a base station 20.

As shown in FIG. 2, the apparatus for controlling power in a terminal in accordance with the invention includes a moving speed measuring unit 11, a CQI report determining unit 12, a message transceiver 13 and a power controller 14.

The moving speed measuring unit 11 measures a moving speed of the terminal 10 in a conventional manner.

The CQI report determining unit 12 determines that it requests the base station 20 to adjust a CQI report frequency when the moving speed measured by the moving speed measuring unit 11 exceeds a threshold value, and determines a CQI measurement and report frequency based on CQI report frequency information (which is information on CQI report frequency determined by the base station in response to the request for CQI report frequency adjustment) in a message received from the base station 20 to report CQI.

The message transceiver 13 transmits a request message for CQI report frequency adjustment to the base station 20 when the CQI report determining unit 12 determines that it requests the base station 20 to adjust a CQI report frequency, delivers a CQI report message from the CQI report determining unit 12 to the base station 20, and receives a message containing CQI report frequency information (which is information on CQI report frequency determined by the base station in response to the request message for CQI report frequency adjustment) from the base station 20.

The power controller 14 performs a power control in response to a power control signal created by the CQI reported from the base station 20.

To be more specific, the CQI report determining unit 12 determines to keep a predetermined CQI measurement and report frequency when the moving speed measured by the moving speed measuring unit 11 does not exceed the threshold value, and determines to make a request for CQI report adjustment to increase the CQI report frequency when the measure moving speed exceeds the threshold value.

Therefore, even though the terminal 10 moves at high speed, the base station 20 can efficiently perform a power control.

Meanwhile, in the apparatus for controlling power in a terminal in accordance with one embodiment of the invention, as mentioned above, the terminal 10 requested the base station 20 to adjust the CQI report frequency by using a request message for CQI report frequency adjustment, but when the base station 20 determines to keep the CQI report frequency and transmits a CQI report frequency keep message to the terminal 10, the terminal 10 keeps a predetermined CQI report frequency (not shown).

Based on the power control result corresponding to the moving speed of the terminal 10 from the base station 20, the moving speed of the terminal 10 at the moment when it is judged that the power control from the base station 20 is not unsuitable for the terminal 10 is preferably set to the threshold value.

Further, the moving speed measuring unit 11 measures a moving speed of the terminal by the following equation, details of which will be omitted since they are widely known.

$$Vd = \frac{fd}{fc}C \qquad \text{Eq. (1)}$$

wherein Vd denotes a moving speed of a terminal, fd denotes a Doppler frequency, fc denotes a carrier frequency, and C denotes a propagation velocity ($3\times10^8$ m/s).

Meanwhile, the apparatus for controlling power in a base station in accordance with the invention includes a CQI report frequency database 21, a message transceiver 22, a transmission rate comparing unit 23, a CQI report frequency determining unit 24, and a power controller 25.

The CQI report frequency database 21 stores CQI report frequency information corresponding to each uplink data transmission rate in advance.

The message transceiver 22 receives the request message for CQI report frequency adjustment and the CQI report message from the terminal 10. Further, it transmits a CQI report frequency keep message to the terminal 10 when the downlink data transmission rate of the terminal 10 does not exceed an average downlink data transmission rate of all terminals based on a comparison result from the data transmission rate comparing unit 23, and transmits, to all terminals, a message containing the CQI report frequency information (CQI report frequency information message) from the CQI report frequency determining unit 24 when the downlink data transmission rate of the terminal 10 exceeds the average downlink data transmission rate of all terminals.

The data transmission rate comparing unit 23 compares the downlink data transmission rate of the terminal 10 with the average downlink data transmission rate of all terminals when the message transceiver 22 receives the request message for CQI report frequency adjustment.

The CQI report frequency determining unit 24 checks an uplink data transmission rate and then determines a CQI report frequency by using the CQI report frequency database 21 when the downlink data transmission rate of the terminal 10 exceeds the average downlink data transmission rate of all terminals as a comparison result of the data transmission rate comparing unit 23.

The power controller 25 performs a power control of all terminals in response to the CQI report message received from the terminal 10.

Here, the CQI report frequency database 21 manages CQI report frequency information corresponding to an uplink data transmission rate since the uplink data transmission rate decrease as a CQI report frequency increases.

In addition, in response to the CQI report message from the terminal 10, the power controller 25 transmits a power control signal to all terminals for their power controls.

The term "all terminals" used herein denote the ones connected to the base station.

Figure 3:
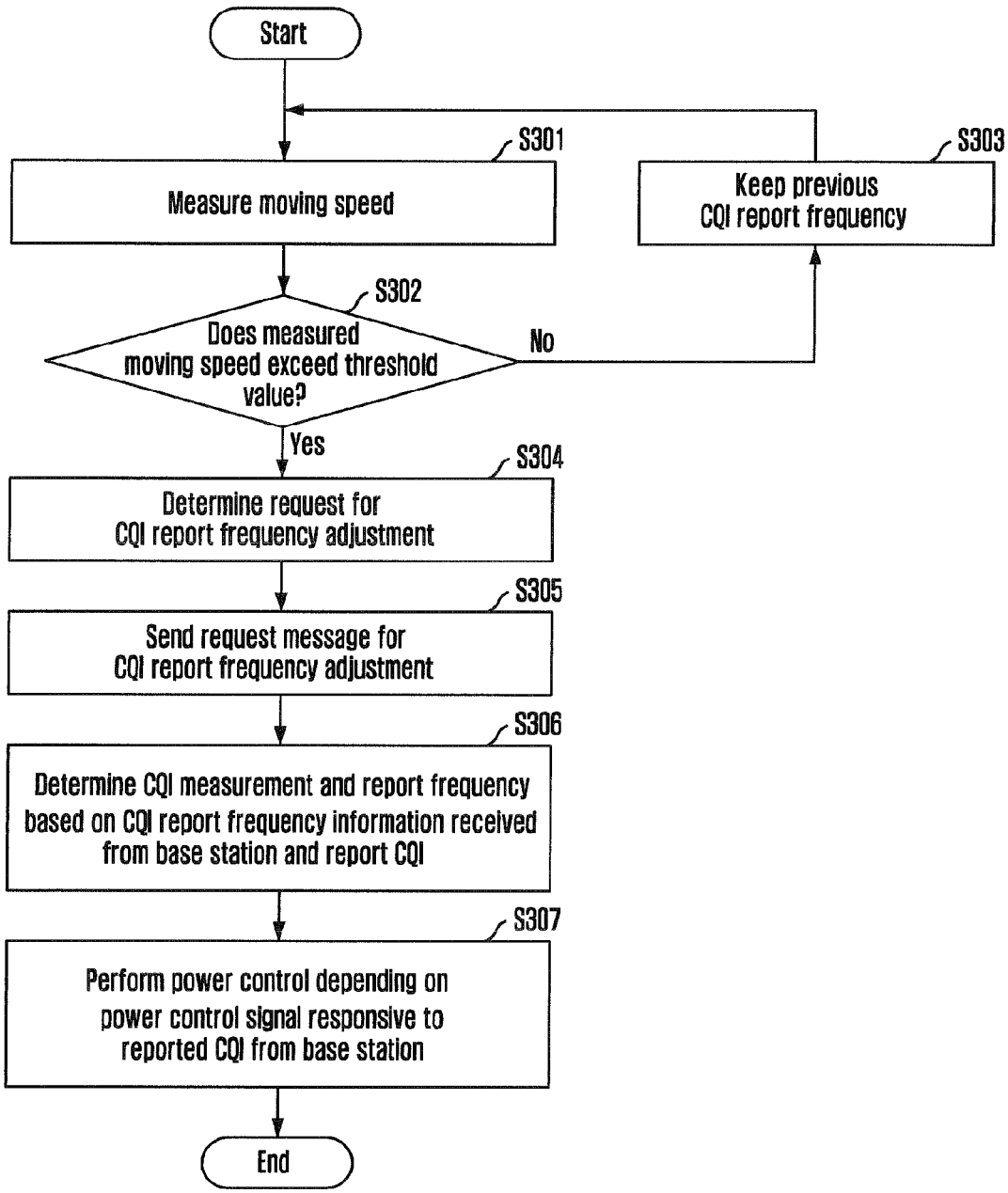
FIG. 3 is a flowchart for explaining a method for controlling power in a terminal in accordance with another embodiment of the present invention.

FIG. 3 is a flowchart for explaining a method for controlling power in a terminal in accordance with another embodiment of the present invention.

First, the process of the present invention measures a moving speed of the terminal 10 in step S301.

Next, the process checks whether or not the measured moving speed exceeds a threshold value in step S302.

As a result of checking in step S302, when the measured moving speed does not exceed the threshold value, the process keeps a predetermined CQI report frequency in step S303.

As a result of checking in step S302, however, when the measured moving speed exceeds the threshold value, the process determines that it requests the base station 20 to adjust a CQI report frequency in step S304.

Thereafter, the process transmits a request message for CQI report frequency adjustment to the base station 20 in step S305.

In succession, the process determines a CQI measurement and report frequency based on CQI report frequency information in a message received from the base station 20 and then reports CQI in step S306.

Next, the process performs a power control in response to a power control signal created by the CQI reported from the base station 20 in step S307. That is, the base station 20 calculates an output power of the terminal depending on the CQI reported from the terminal 10 and then transmits its corresponding power control signal to all terminals for their power controls.

The following is a further description for the method for controlling power in a terminal in accordance with another embodiment of the present invention.

The terminal 10 continuously measures its own moving speed by using a downlink sync signal and compares it with a predetermined threshold value. At this time, when the measured moving speed is less than the threshold value, the terminal 10 keeps a previously determined CQI measurement and report frequency. However, when the measured moving speed is greater than the threshold value, the terminal 10 transmits a message desiring adjustment of a CQI report frequency to the base station 20 and then waits for a response therefrom. When a message containing CQI report frequency information arrives at the terminal 10 from the base station 20, the terminal 10 increases the CQI measurement and report frequency to adapt efficiently to a high speed movement based on the massage.

The terminal 10 continuously performs this procedure, so that an appropriate power control can be made depending on its own moving speed.

Meanwhile, in the method for controlling power in a terminal in accordance with another embodiment of the present invention, as described above, the terminal 10 transmits a request message for CQI report frequency adjustment to do so, but when the base station 20 determines to keep the CQI report frequency and transmits a CQI report frequency keep message, the terminal 10 keeps a predetermined CQI report frequency (not shown).

Figure 4:
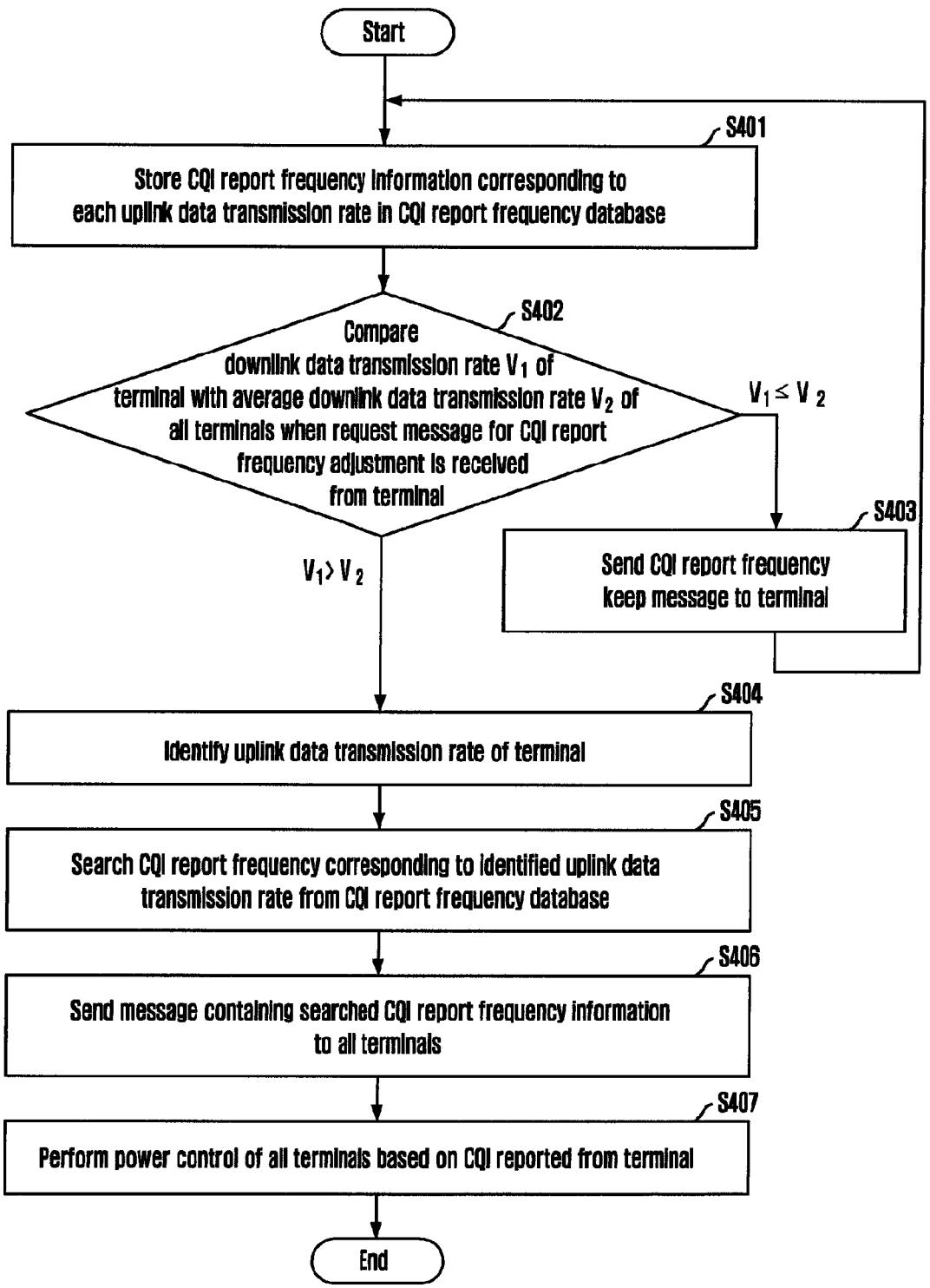
FIG. 4 is a flowchart for explaining a method for controlling power in a base station in accordance with another embodiment of the present invention.

FIG. 4 is a flowchart for explaining a method for controlling power in a base station in accordance with another embodiment of the present invention.

First, the CQI report frequency database 21 stores CQI report frequency information corresponding to each uplink data transmission rate in advance in step S401.

Next, when a request message for CQI report frequency adjustment is received from the terminal 10, the process of the invention compares a downlink data transmission rate of the terminal 10 with an average downlink data transmission rate of all terminals in step S402.

As a result of comparison in step S402, when the downlink data transmission rate of the terminal 10 does not exceed the average downlink data transmission rate of all terminals, the process transmits a CQI report frequency keep message to the terminal 10 in step S403.

As a result of comparison in step S402, however, when the downlink data transmission rate of the terminal 10 exceeds the average downlink data transmission rate of all terminals, the process checks an uplink data transmission rate of the terminal 10 in step S404.

Subsequently, the process searches for a CQI report frequency corresponding to the checked uplink data transmission rate from the CQI report frequency database 21 in step S405.

Next, the process transmits a message containing the searched CQI report frequency information to all terminals in step S406.

In succession, the process performs a power control of all terminals based on the CQI reported from the terminal 10 in step S407.

The following is a further description for the method for controlling power in a base station in accordance with another embodiment of the present invention.

First, the base station 20 receives, from the terminal 10 moving at high speed, a current moving speed and a request message for CQI report frequency adjustment desiring to change a CQI report frequency. When the request message for CQI report frequency adjustment is received, the base station 20 compares a downlink data transmission rate of the terminal 10 that has transmitted the request message for CQI report frequency adjustment with an average downlink data transmission rate of all terminals. At this time, when the downlink data transmission rate of the terminal 10 is faster than the average downlink data transmission rate of all terminals which leads to a loss of data in the terminal that has a significant effect on an overall data transmission rate of the base station 20, the base station 20 determines to change the CQI report frequency for keeping the overall downlink data transmission rate, and also determines an appropriate report frequency and transmits it to all terminals as a message.

However, when the data transmission rate of the terminal 10 is low enough not to have a significant effect on the overall data transmission rate of the base station 20 although data in the terminal 10 is lost, the previously allocated CQI report frequency is maintained for the overall transmission rate even though there is a risk that some of packets in the terminal will be lost.

The reason for such determination is that as a CQI report frequency increase, an additional message for report of CQI should be sent to an uplink which lowers its transmission rate.

As mentioned above, the present invention can efficiently perform a power control even when there is an abrupt change in a wireless channel environment that occurs while a mobile communication terminal moves at high speed, by allowing a terminal to request a base station to adjust a CQI report frequency based on its own moving speed, and, in response to such request for CQI report frequency adjustment from the terminal, the bases station to determine an optimal CQI report frequency using a downlink data transmission rate and an uplink data transmission rate of the terminal.

While the present invention has been described with respect to the specific embodiments, it will be apparent to those skilled in the art that various changes and modifications may be made without departing from the spirit and scope of the invention as defined in the following claims.

What is claimed is:

1. An apparatus for controlling power in a terminal, comprising:
   a moving speed measuring unit for measuring a moving speed of the terminal;
   a Channel Quality Indicator (CQI) processing unit including a CQI report determining unit, wherein the CQI report determining unit determines to make a request for CQI report frequency adjustment to a base station to adjust a CQI report frequency when the moving speed measured by the moving speed measuring unit exceeds a threshold value, and determines a CQI measurement and report frequency based on information on the CQI report frequency received from the base station to report the CQI measurement and report frequency; and
   a power controller for performing a power control in response to a power control signal created by the CQI reported from the base station.

2. The apparatus of claim 1, wherein the CQI processing unit determines to keep a predetermined CQI measurement and report frequency when the moving speed measured by the moving speed measuring unit does not exceed the threshold value, and determines to request the base station to adjust the CQI report frequency when the measured moving speed exceeds the threshold value.

3. The apparatus of claim 1, wherein the request for CQI report frequency adjustment is a request for increase in CQI report frequency for preventing an inaccurate power control from occurring when the terminal moves at high speed.

4. The apparatus of claim 1, wherein the CQI processing unit further includes:
   a message transceiver for transmitting a request message for CQI report frequency adjustment to the base station when the CQI report determining unit determines to make a request for CQI report frequency adjustment, transmitting a CQI report message from the CQI report determining unit to the base station, and receiving a message containing information on the CQI report frequency from the base station.

5. A method for controlling power in a terminal, comprising:
   determining to make a request for Channel Quality Indicator (CQI) report frequency adjustment to a base station when a moving speed of the terminal exceeds a threshold value;
   transmitting a request message for CQI report frequency adjustment to the base station based on the determination;
   determining a CQI measurement and report frequency depending on information on CQI report frequency from the base station and reporting CQI to report CQI; and
   performing a power control in response to a power control signal created by the CQI reported from the base station.

6. The method of claim 5, wherein said determining a request for CQI report frequency adjustment includes:
   measuring a moving speed of the terminal and checking whether the measured moving speed exceeds a threshold value;
   when the measured moving speed does not exceed the threshold value, keeping a predetermined CQI report frequency; and
   when the measured moving speed exceeds the threshold value, determining to make a request for CQI report frequency adjustment to the base station.

7. The method of claim 5, wherein the request for CQI report frequency adjustment is a request for increase in CQI report frequency for preventing an inaccurate power control from occurring when the terminal moves at high speed.

8. The method of claim 5, further comprising keeping a predetermined CQI report frequency in response to a CQI report frequency keep message from the base station.

9. An apparatus for controlling power in a base station, comprising:
   a storing unit for storing information on Channel Quality Indicator (CQI) report frequency corresponding to an uplink data transmission rate;
   a CQI report frequency processing unit for comparing a downlink data transmission rate of a terminal with an average downlink data transmission rate of all terminals in response to a request message for CQI report frequency adjustment to determine a CQI report frequency corresponding to the uplink data transmission rate of the terminal; and
   a power controller for performing a power control of all terminals based on the CQI reported from the terminal.

10. The apparatus of claim 9, wherein the CQI report frequency processing unit includes:
    a data transmission rate comparing unit for comparing a downlink data transmission rate (hereinafter, "first transmission rate") of the terminal with an average downlink data transmission rate (hereinafter, "second transmission rate") of all terminals in response to a request message for CQI report frequency adjustment from terminal; and
    a CQI report frequency determining unit for searching the storing unit to determine a CQI report frequency corresponding to the uplink data transmission rate of the terminal when the first transmission rate exceeds the second transmission rate.

11. A method for controlling power in a base station, comprising:
    receiving a request message for Channel Quality Indicator (CQI) report frequency adjustment from a terminal;

checking an uplink data transmission rate of the terminal when a downlink data transmission rate of the terminal exceeds an average downlink data transmission rate of all terminals;

searching for a CQI report frequency corresponding to the checked uplink data transmission rate from a CQI report frequency database;

transmitting a message containing information on the searched CQI report frequency to all terminals; and performing a power control of all terminal based on CQI reported from the terminal.

12. The method of claim 11, wherein said checking an uplink data transmission rate of the terminal includes:

comparing a downlink data transmission rate of the terminal with an average downlink data transmission rate of all terminals when a request message for CQI report frequency adjustment is received from the terminal;

when the downlink data transmission rate of the terminal does not exceed the average downlink data transmission rate of all terminals, transmitting a CQI report frequency keep message to the terminal; and when the downlink data transmission rate of the terminal exceeds the average downlink data transmission rate of all terminals, checking an uplink data transmission rate of the terminal.

* * * * *